Patented Apr. 28, 1936

2,038,590

UNITED STATES PATENT OFFICE 2,038,590

ZINC SULPHIDE PIGMENTS AND METHOD OF MAKING THE SAME

Thomas A. Mitchell and Royal L. Sessions, Denver, Colo., assignors, by mesne assignments, to Hughes-Mitchell Processes, Incorporated, Denver, Colo., a corporation of Wyoming No Drawing. Application August 5, 1931, Serial No. 555,362

13 Claims. (Cl. 134—78)

This invention relates to zinc sulphide pigment and particularly to a pigment which may be readily dispersed in oil and which is protected by a coating of a light resistant material from the deleterious action of the ultra-violet rays of sunlight.

Zinc sulphide is ordinarily precipitated from a zinc chloride solution by means of barium sulphide or sodium sulphide and then calcined to remove the water of hydration and produce a pigment material of maximum density, after which it is quenched and washed in water and ultimately dried and disintegrated for mixing with oil to form a paint.

Zinc sulphide as thus made tends to darken under the action of sunlight, and various remedies therefor have been proposed. One has involved coating the zinc sulphide particle with a film which serves to conceal the darkening that has taken place beneath. Zinc oxide is easily formed during the manufacture of the pigment and particularly if the sulphide is calcined under slightly oxidizing conditions; hence it has been proposed to use this material as a coating. It however is not satisfactory, and particularly because it turns yellow and so discolors the paint. On the other hand, it is recognized as being desirable that the pigment be provided with a coating which is both white and unaffected by sunlight.

It is accordingly one object of our invention to provide a zinc sulphide pigment in which the particles are coated with a light-resistant material capable of retaining a white color and of serving as a valuable ingredient in a paint and which in particular masks the darkening of the pigment under the action of sunlight and otherwise aids in improving the properties of zinc sulphide as commercially produced for use as a pigment.

It has also been recognized that the alkalinity of the zinc sulphide should be controlled during the process of manufacture, but considerable confusion is found in the literature as to just what purpose this alkalinity serves and how it may be best obtained. In acordance with one procedure, the zinc sulphide pulp, after precipitation and before calcination, has a definite hydrate content established in it by the addition of barium hydrate as indicated by titration tests. It was considered that the zinc sulphide product should be alkaline before and during the calcining operation, because if it became neutral or slightly acid during calcination, the finished product would have a distinctly inferior light resistance quality. Owing however to the subsequent washing treatments, any film of barium hydrate or oxide which formed on the pigment was likely to be dissolved entirely or partially, thus defeating one purpose for which it was intended.

A further object is to control the alkalinity of the pulp just prior to the calcining operation, and at the same time to insure that a protective film of desired thickness is formed and remains after the calcining and washing operations.

Also, it is desirable that the pigment have a definite alkalinity at the time it is mixed with oil so as to aid in dispersing the particles. But, since the calcination treatment of the prior art has been followed by the usual steps of quenching and washing in water, the alkalinity imparted to the pulp has been destroyed or decreased, depending upon the particular methods or conditions prevailing in the plant at the time, so that the material did not have a predetermined and uniform alkalinity when ready for mixing with the oil. It has also been proposed to reduce the alkalinity of a pigment by washing it with water, but obviously this procedure does not lend itself to accurate control.

We have found it highly desirable to control the alkalinity of the zinc sulphide pigment just prior to its being introduced into the oil so as to aid dispersion, hence another object of our invention is to accomplish this purpose and to provide a zinc sulphide pigment having a predetermined alkalinity which mixes easily with oil and will not thicken or blubber and which will form a paint having a superior hiding power as well as ease of application to the surface being painted and other desirable characteristics.

In accordance with our invention, we propose to control the hydrate content of the zinc sulphide pulp both before and after calcination and to provide the particles of the pigment with a coating of a material which is not dissolved from the pigment by the usual washing operations and which is not affected by sunlight or atmospheric conditions but will form a masking film over the oxidizable zinc sulphide, thereby not only hindering oxidation of the pigment by the oxygen of the air, but also serving to conceal the darkening which may have taken place and therefore increasing the useful life of the paint. It of course is desirable that this coating be made of a material which itself is white and so will serve to reflect light to the maximum extent and produce a white surface.

The hydrate content of the raw zinc sulphide pulp may be controlled by the addition of various alkaline materials, but we prefer to employ barium hydrate, since such a material will not deleteriously affect the pigment and it results in the formation of a coating of barium oxide on the zinc sulphide particle. Since this barium oxide film may be removed to some extent by the subsequent operations of quenching the pigment in water and grinding it in oil, we also propose to use alumina, which is insoluble in water and will provide an effective white coating on the pigment. By combining aluminum and barium hydrates, we not only give the pulp a desired hydrate content, but also cause the formation of the insoluble aluminum oxide during calcination, which will serve in cooperation with such barium oxide as remains on the zinc sulphide to provide a protective film.

The pigment is rendered easily dispersible in oil by controlling the alkalinity of the zinc sulphide. We accomplish this by introducing into the pigment a definite amount of alkaline material, and this is done at such a stage that the zinc sulphide is given a controlled alkalinity which will not be affected by any further treatment. For this purpose, we may utilize various materials, such as magnesium hydrate, barium hydrate, and sodium hydrate or carbonate, or various other materials which have been found suitable for the purpose. This alkaline reagent, and preferably barium hydrate, is introduced in accordance with our invention after all of the washing operations have been completed and the zinc sulphide has been brought into substantially its final condition. That is, the zinc sulphide pulp is treated after precipitation to remove undesired impurities, if necessary, and then heated in a muffle, quenched, wet ground, further purified and washed. Thereafter, the pulp which may have been brought to a neutral condition, is treated with a definite amount of an alkaline reagent of the character above referred to, so that the sulphide will be given a controlled alkalinity.

One manner of carrying out this invention involves the following steps. The zinc sulphide may be formed in any suitable manner and preferably by precipitation by means of sodium or barium sulphide from a zinc salt solution, such as zinc chloride, which has been suitably purified. This zinc sulphide pulp is first separated from the solution, as by filtration, and repulped in water, care having been taken to avoid the presence of zinc hydrate. Since the original ingredients included the chloride ion, there may be some of this adsorbed on the pigment, hence care should be taken to remove this adsorbed ion. This may be done in various ways, such as by washing the pulp to a sufficient extent to insure removal of the adsorbed chloride ion. We may also employ the method set forth and claimed in our co-pending application Serial No. 543,735 filed June 11, 1931, in accordance with which the adsorbed chloride, such as $BaCl_2$ or $NaCl$, is converted to a volatilizable compound by means of a suitable reagent, such as ammonium carbonate or ammonium sulphate, so that the chlorine atom is driven off during calcination of the pigment, after which traces of zinc oxychloride found on the calcined pigment may be removed by treatment with aluminum sulphate.

The pulp is treated prior to calcination, in accordance with our invention, with a solution of barium hydrate to form a coating and control the hydrate content and with aluminum hydrate to supplement the barium compound and insure the formation of an insoluble coating on the pigment particles. While we may use these two materials in various ways, we prefer to dissolve the aluminum hydrate (freshly precipitated) in a barium hydrate solution, and preferably employ a barium hydrate solution saturated with aluminum hydrate so as to carry a large amount of the latter. A definite amount of the mixture is added to the pigment after the pulp has been thoroughly washed, so that the material adsorbed on the pigment particles imparts a definite hydrate content thereto. As an example of a satisfactory solution for our purposes, we may use a cold solution of barium hydrate saturated with aluminum hydrate, the solute analyzing 17.7% of $Al_2O_3$ content and 82.3% of BaO content. A hot solution will give about 11.7% of alumina and 88.3% of barium oxide. If 50% of the barium is lost during the subsequent operation of quenching in water and grinding in oil, this would give from 30 to 21% of alumina in the coating.

The moisture in the pulp affects the alkalinity, hence if a definite percentage of moisture is to be left in the pulp after drying, such as 4 to 10%, the amount of hydrate added will be controlled accordingly. The more moist the pulp is to be left, the lower will be the amount of aluminum and barium hydrates added thereto. The determination of this hydrate content can, of course, be effected by suitable laboratory methods, such as by titrating the solution received from a sample of the pulp by means of a standard solution of hydrochloric acid of predetermined strength. For example, a proper hydrate content of the pulp will be established in the pulp when from 4 to 5 c. c. of 0.25 N. hydrochloric acid has been used in the titration of 250 c. c. of filtrate. It is not desired to limit this invention to any definite amount or thickness of protective film, since the use to which the pigment will be put will determine largely the thickness of the film to be employed. It however is desirable to insure the formation of sufficient aluminum oxide on the pigment particle to coat it fully.

After the pulp has been thus treated with the aluminum hydrate dissolved in barium hydrate solution, it will be found that the pulp now carries a certain amount of this complex solution adsorbed on the particles. Thereafter the zinc sulphide is calcined at a suitable temperature, such as 650° C. to 750° C., to remove the water of hydration. During this step the hydrates of aluminum and barium will be converted by the heat to aluminum oxide and barium oxide. The calcining operation may be carried on under controlled conditions and preferably in a controlled atmosphere which is not oxidizing. An atmosphere containing 1 or 2% of carbon monoxide or the like will serve the purpose.

The aluminum oxide is neutral to the oxidizing influence of the air and it is a white material. Hence the two oxides will serve to form a white protective film over the zinc sulphide particles. It is to be appreciated, moreover, that aluminum oxide is substantially insoluble in water, hence in the subsequent treatment for controlling the alkalinity of the pigment, this film will not be destroyed or removed as has been the case where various other types of material have been used for forming the protective film.

The coated pigment has a varying test for alkalinity due to the presence of residual unwashed barium oxide. We propose to control this condition and to impart to the pigment a definite degree of alkalinity, so that the pigment will be readily dispersable in oil. Unless the pigment gives a uniform reaction for alkalinity, the ease and uniformity of grinding in oil will vary. The higher the degree of alkalinity, the more easily will the material be readily mixed with oil. However, too much alkalinity causes the paint to blubber, hence the amount of alkalinity should be carefully controlled. An attempt has been made heretofore to control the alkalinity by washing the zinc sulphide but it is difficult to control such an operation. Also, it has been proposed to add definite amounts of alkaline materials during the earlier stages of the manufacture of the pigment and just prior to the muffling operation. However, such addition of alkalinity producing reagent has been followed by subsequent washing operations with the result that the alkalinity has been oftentimes entirely removed during the later stages of the process. Consequently, there has been no definite control of the alkalinity in the final zinc sulphide pigment. In accordance with our process we propose to introduce an alkaline reagent after all washing operations have been accomplished and thus to leave the material in the final state to which we bring it by this step of the process. Consequently, we wait until the pulp has been treated in all of its necessary stages to muffle, quench and wet-grind it. Then it is preferably brought to a neutral condition, whereby it may be treated with a calculated amount of a suitable reagent to have a definite alkalinity imparted thereto. Our process is not limited to the use of any particular reagent, but such materials as sodium hydrate or carbonate, magnesium oxide or hydrate, barium hydrate or sulphide, calcium oxide or hydrate and the like may be employed, and the amounts used will be definitely calculated in accordance with standard chemical procedure. For example, we may add one pound of magnesia to 100 pounds of pigment, or less if desired.

The range of alkalinity may be determined and controlled by suitable laboratory methods. For the best results, it is desirable to keep the alkalinity within narrow limits, and this may be accomplished by frequent examinations of samples of the pigment. This may be done by titrating the sample with sulphuric acid, using methyl orange as an indicator. For example, we may stir a 50-gram sample of the pigment for five minutes in 250 cubic centimeters of distilled water at room temperature and then filter the mixture. The best results are obtained if the alkalinity is such that it requires from two to four cubic centimeters of a N/50 solution of $H_2SO_4$ to titrate 100 c. c. of the filtrate and change the indicator to a pink color. If less than this alkalinity is obtained, the pigment does not mix as readily with the oil. A greater degree of alkalinity is also objectionable since the paint tends to become thick on standing. Such a pigment has a uniform dispersion in oil which does not vary from batch to batch as it is made.

Following this procedure, the pigment may be dried and disintegrated for packing or such other steps taken as are desirable. The pigment as thus made comprises the white zinc sulphide coated with barium and aluminum oxides and having an alkalinity suitable for dispersion in oil. It is to be observed that the aluminum oxide coating material is not affected by the alkalinity control step of the process and that the thickness of the coating as well as the degree of alkalinity may therefore be made as desired.

Having thus described our invention, what we claim as new and desire to secure by Letters Patent is:

1. The method of making a zinc sulphide pigment comprising the steps of precipitating zinc sulphide from a zinc salt solution, calcining the precipitate to form anhydrous zinc sulphide and produce a material suitable for use as a pigment, and coating the pigment particles with a mixture of barium and aluminum oxides which serve in a light resistant and protective capacity.

2. The method of making a zinc sulphide pigment comprising the steps of preparing hydrated zinc sulphide, treating the same with aluminum hydrate dissolved in barium hydrate and forming a coating of said hydrates thereon, and thereafter calcining the mixture and producing zinc sulphide pigment particles coated with light-resistant aluminum and barium oxides.

3. The method of making zinc sulphide pigment comprising the steps of preparing hydrated zinc sulphide pulp, coating the pulp particles with a solution containing aluminum and barium hydrates and imparting a hydrate content to the pulp which renders it alkaline, drying the coated pulp and calcining it to remove the water of hydration and to provide a coating comprising alumina and barium oxide on the individual particles of anhydrous zinc sulphide.

4. The method of making zinc sulphide pigment comprising the steps of precipitating zinc sulphide pulp from a zinc salt bath, removing the pulp from the bath, adding to the pulp a solution of aluminum and barium hydrates to impart a definite alkalinity thereto and to coat the particles with films of said solution, drying the wet pulp and calcining it to form anhydrous zinc sulphide particles individually coated with barium and aluminum oxides.

5. The method of claim 3 in which a solution of barium hydrate saturated with aluminum hydrate is employed to impart a definite hydrate content to the pulp and which is calcined to produce a coating on the pigment particles containing a desired amount of alumina.

6. The method of making zinc sulphide pigment comprising the steps of precipitating hydrated zinc sulphide from a zinc chloride solution, separating the precipitate from the solution, treating the pulp with a definite amount of barium and aluminum hydrates to impart a desired alkalinity thereto and to provide a coating for the pigment particles, and thereafter calcining the material to remove the water of hydration from the zinc sulphide and form a coating containing barium and aluminum oxides on the pigment particles.

7. The method of making zinc sulphide pigment comprising the steps of precipitating zinc sulphide from a zinc salt solution and preparing hydrated zinc sulphide pulp, adding to the pulp a solution of aluminum hydrate in barium hydrate and imparting a definite hydrate content and controlled alkalinity to the pulp, drying and calcining the zinc sulphide and dehydrating the same, while forming a coating on the pigment comprising aluminum and barium oxides, washing the calcined pigment finally and thereafter adding an alkaline dispersion reagent capable of and proportioned for imparting a definite alkalinity thereto, thereby producing zinc sulphide pigment of uniform alkalinity which is easily dispersible in oil.

8. The method of making a zinc sulphide pigment comprising the steps of precipitating zinc sulphide pulp from a zinc salt solution, removing the pulp from the solution, adding to the pulp a solution containing barium and aluminum hydrates, drying the wet pulp and calcining it to remove the water and provide anhydrous zinc sulphide coated with barium and aluminum oxides, washing the same, and thereafter imparting a definite alkalinity to the pigment and rendering it readily dispersible in oil, and without further treatment with water drying and disintegrating the pigment for use in a paint.

9. A zinc sulphide pigment comprising zinc sulphide which has been calcined from the hydrated form and which contains a definite amount of aluminum oxide combined with barium oxide as a coating on the particles of the pigment.

10. A zinc sulphide pigment comprising zinc sulphide calcined from the hydrated form and containing aluminum oxide associated therewith as a coating and which has a predetermined alkalinity imparted thereto.

11. A zinc sulphide pigment comprising a mass of chloride free, calcined zinc sulphide which has a protective coating containing aluminum oxide and a predetermined degree of alkalinity and a uniform dispersion in oil.

12. A zinc sulphide pigment comprising calcined zinc sulphide substantially free from contaminating chlorides and having a protective coating containing aluminum oxide and barium oxide, and which has a definite alkalinity imparted to the pigment and is easily dispersible in oil.

13. A zinc sulphide pigment comprising finely divided, anhydrous calcined zinc sulphide which is free from adsorbed chlorides, said calcined pigment having a coating of barium and aluminum oxides and containing a definite amount of an alkalinity imparting and dispersion reagent and being readily and uniformly dispersible in oil for use as a paint.

THOMAS A. MITCHELL.
ROYAL L. SESSIONS.